US008393538B2

(12) United States Patent
Matsuhisa et al.

(10) Patent No.: US 8,393,538 B2
(45) Date of Patent: Mar. 12, 2013

(54) SELF CHECKOUT TERMINAL AND CONTROL METHOD OF THE SAME

(75) Inventors: Kaoru Matsuhisa, Shizuoka (JP); Toshiyasu Terahara, Shizuoka (JP); Yuuki Kawaguchi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 240 days.

(21) Appl. No.: 12/862,085

(22) Filed: Aug. 24, 2010

(65) Prior Publication Data

US 2011/0057035 A1 Mar. 10, 2011

(30) Foreign Application Priority Data

Sep. 4, 2009 (JP) ................................ 2009-205067

(51) Int. Cl.
*G06K 15/00* (2006.01)

(52) U.S. Cl. ...................................................... 235/383

(58) Field of Classification Search .................. 235/383, 235/385; 705/14.1, 16, 18
See application file for complete search history.

(56) References Cited

U.S. PATENT DOCUMENTS

| | | | | |
|---|---|---|---|---|
| 4,676,343 | A * | 6/1987 | Humble et al. | 186/61 |
| 6,062,477 | A * | 5/2000 | Wike et al. | 235/462.43 |
| 6,837,428 | B2 * | 1/2005 | Lee et al. | 235/383 |
| 7,255,200 | B1 * | 8/2007 | Walter | 186/64 |
| 7,845,554 | B2 * | 12/2010 | Jacobs | 235/383 |
| 2011/0147454 | A1 | 6/2011 | Matsuhisa et al. | |
| 2011/0192900 | A1 | 8/2011 | Terahara et al. | |

FOREIGN PATENT DOCUMENTS

| | | |
|---|---|---|
| JP | 62-020066 | 1/1987 |
| JP | 04260194 A * | 9/1992 |
| JP | 06-195566 | 7/1994 |
| JP | 10-69360 | 3/1998 |
| JP | 2001-006051 | 1/2001 |
| JP | 2003-051067 | 2/2003 |
| JP | 2006-244158 | 9/2006 |
| JP | 2007-148723 | 6/2007 |
| JP | 2009-129113 | 7/2009 |

OTHER PUBLICATIONS

Japanese Office Action for Japanese Application No. 2009-205067 mailed on Feb. 7, 2012.
Japanese Office Action for Application No. 2009-205067 mailed on Jul. 26, 2011.

* cited by examiner

*Primary Examiner* — Seung Lee
(74) *Attorney, Agent, or Firm* — Turocy & Watson, LLP

(57) ABSTRACT

According to one embodiment, a self checkout terminal includes a reading section, a main display, a ticker display and a controller. The reading section reads identification information of a commodity from the commodity. The main display displays information relating to the commodity whose identification information is read by the reading section to an operator. The ticker display displays information in the same direction as the main display and is provided at a position closer to the reading section than the main display. The controller controls the ticker display and causes arbitrary information to be selectively displayed.

15 Claims, 4 Drawing Sheets

40

| PLU code | Commodity information | | | |
|---|---|---|---|---|
| | Name | Unit price | Producing district information | • • • |
| | | | | |
| | | | | |
| | | | | |
| | | | | |

FIG. 3

41

| Operation | Display content |
|---|---|
| Standby | CM information |
| Accounting start | Reading window guide |
| Barcode scan | Commodity information |
| Settlement | Point information |

FIG. 4

SELF CHECKOUT TERMINAL AND CONTROL METHOD OF THE SAME

CROSS-REFERENCE TO RELATED APPLICATIONS

This application is based upon and claims the benefit of priority from Japanese Patent Application No. 2009-205067, filed on Sep. 4, 2009; the entire contents of which are incorporated herein by reference.

FIELD

Embodiments described herein related generally to a self checkout terminal in which a customer himself/herself operates to complete a series of accounting processes and a control method of the same.

BACKGROUND

In general, a counter selling type POS (Point Of Sales) terminal in which a cashier operates to register sales data includes a customer side display to display the amount of money of a registered commodity to a customer during accounting. In some of this type of POS terminals, not only the amount of money of the registered commodity, but also an advertisement of a store and a commodity, news, weather prediction and the like are displayed on the customer side display.

In recent years, in a retail store such as a supermarket or a convenience store, a self checkout type accounting system becomes popular. In this system, a self checkout terminal is used which is a kind of POS terminal and by which a customer himself/herself can complete a series of accounting processes.

The customer himself/herself, who tries to settle the account by the self checkout terminal, holds a barcode attached to a purchased commodity to a reading window of a scanner provided on the housing surface of the terminal, and registers commodity information. When the registration of the commodity information of all commodities is completed, the customer pays for the purchase with cash, card, electronic money or the like and completes the series of accounting processes. In addition to the registered commodity information, the guidance of an operation method for a customer unfamiliar with the operation is displayed on the display provided on the self checkout terminal.

When the self checkout type accounting system as stated above is introduced, it is unnecessary to allocate a clerk to each checkout counter, and the labor cost can be remarkably reduced.

When settling the account by the self checkout type POS terminal, the customer must hold the barcode attached to the commodity to the reading window of the scanner, and accordingly, the frequency of seeing the information displayed on the display is decreased. Then, even if the advertisement of the store and commodity, news, weather prediction and the like are displayed on the display, there is a fear that the content is not sufficiently transmitted to the customer and becomes useless.

Besides, even if the guidance of the operating method is displayed on the display, the customer performs the accounting process while confirming both the reading window and the display, a time required until completion of the account is increased, and there is a fear that another customer is made to wait.

Under such circumstances, in the self checkout terminal, it is necessary to provide a unit configured to improve the information transmitting capacity of the display and a unit configured to smooth the accounting process.

DESCRIPTION OF THE DRAWINGS

FIG. 3 is a schematic view showing an example of a data structure of a PLU file in the embodiment.

FIG. 4 is a schematic view showing an example of a data structure of a display content table in the embodiment.

DETAILED DESCRIPTION

In general, according to one embodiment, a self checkout terminal includes a reading section, a main display, a ticker display and a controller. The reading section reads identification information of a commodity from the commodity. The main display displays information relating to the commodity whose identification information is read by the reading section to an operator. The ticker display displays information in the same direction as the main display and is provided at a position closer to the reading section than the main display. The controller controls the ticker display and causes arbitrary information to be selectively displayed.

Hereinafter, an embodiment will be described with reference to the drawings.

Figure 1:
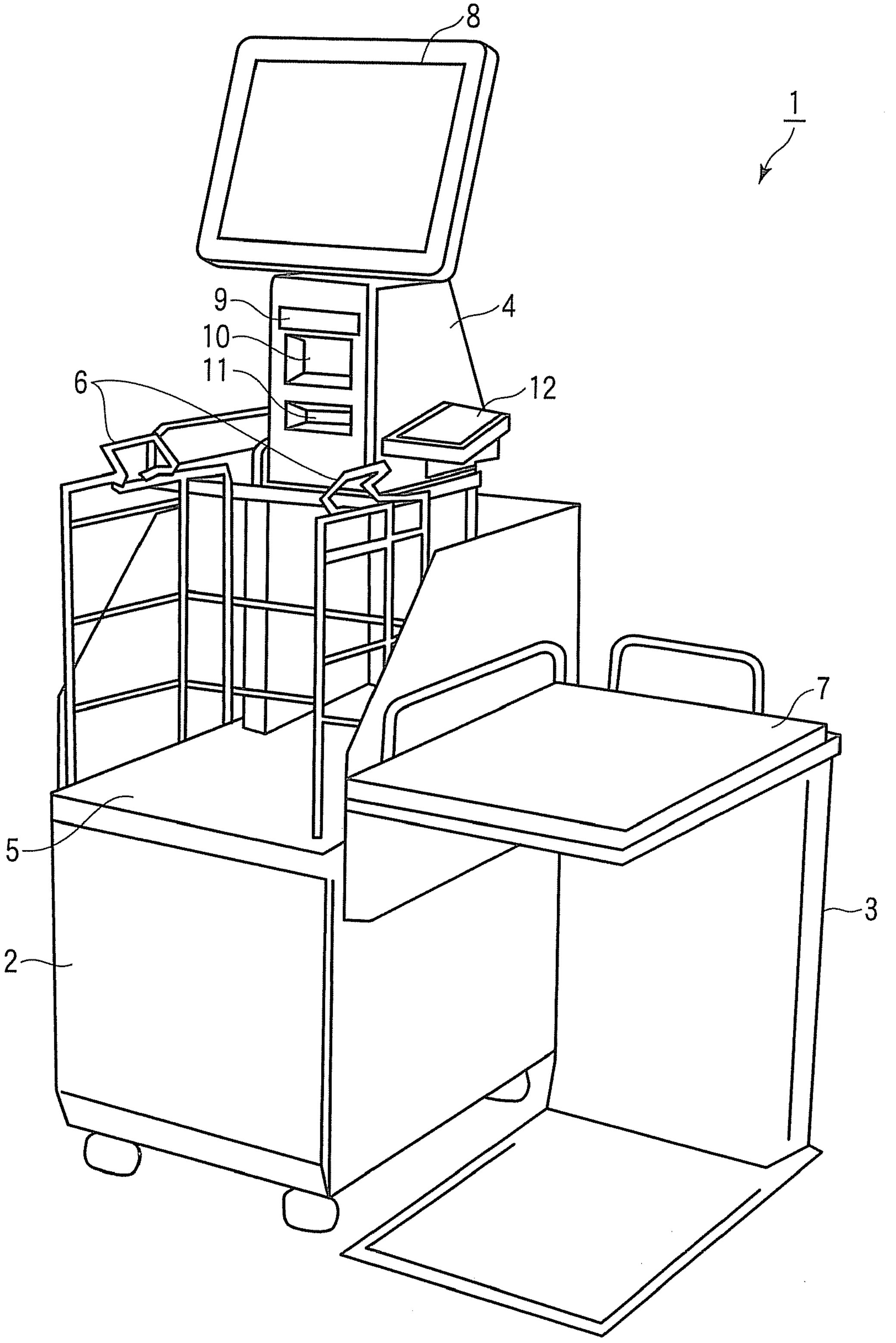
FIG. 1 is an outer appearance perspective view of a self checkout terminal of an embodiment.

FIG. 1 is an outer appearance perspective view of a self checkout terminal of this embodiment. The self checkout terminal 1 includes a commodity placement stand 2 provided with a receiving surface 5 on which a commodity whose a PLU (Price Look Up) code is inputted is placed and a pair of hook sections 6 to which a handle portion of a shopping bag is hooked, a commodity placement stand 3 provided with a receiving surface 7 on which a commodity whose PLU code is not inputted is placed, and a main body 4 mounted on the commodity placement stand 2.

The commodity placement stand 2 includes a weight measuring unit (not shown) to measure the weight of a commodity placed on the receiving surface 5 and the weight of a commodity packed in the shopping bag attached to the hook section 6. The commodity placement stand 3 includes a weight measuring unit (not shown) to measure the weight of a commodity placed on the receiving surface 7. The weight measured by the weight measuring units is used for weight check to prevent input omission of the PLU code and unfairness.

The main body 4 includes a display unit 8 (main display), a ticker display 9, a reading window 10 (reading section) used for scanning of a barcode attached to a commodity, a receipt issue port 11 to discharge a receipt, and an electronic settlement terminal 12 to wireless communicate with an electronic money storage medium.

The display unit 8 is a display with a touch panel in which a touch panel is attached to a CRT (Cathode Ray Tube), an LCD (Liquid Crystal Display), an OEL (Organic Electro-Luminescence) or the like.

The ticker display 9 is a display, such as a CRT, an LCD, an OEL or a VFD (Vacuum Fluorescent Display), which is provided between the display unit 8 and the reading window 10 and the display surface of which is directed in the same direction as the display unit 8. Incidentally, that the ticker display 9 is provided between the display unit 8 and the reading window 10 has the same meaning as that the ticker display 9 is provided at a position closer to the reading window 10 than the display unit 8.

Figure 2:
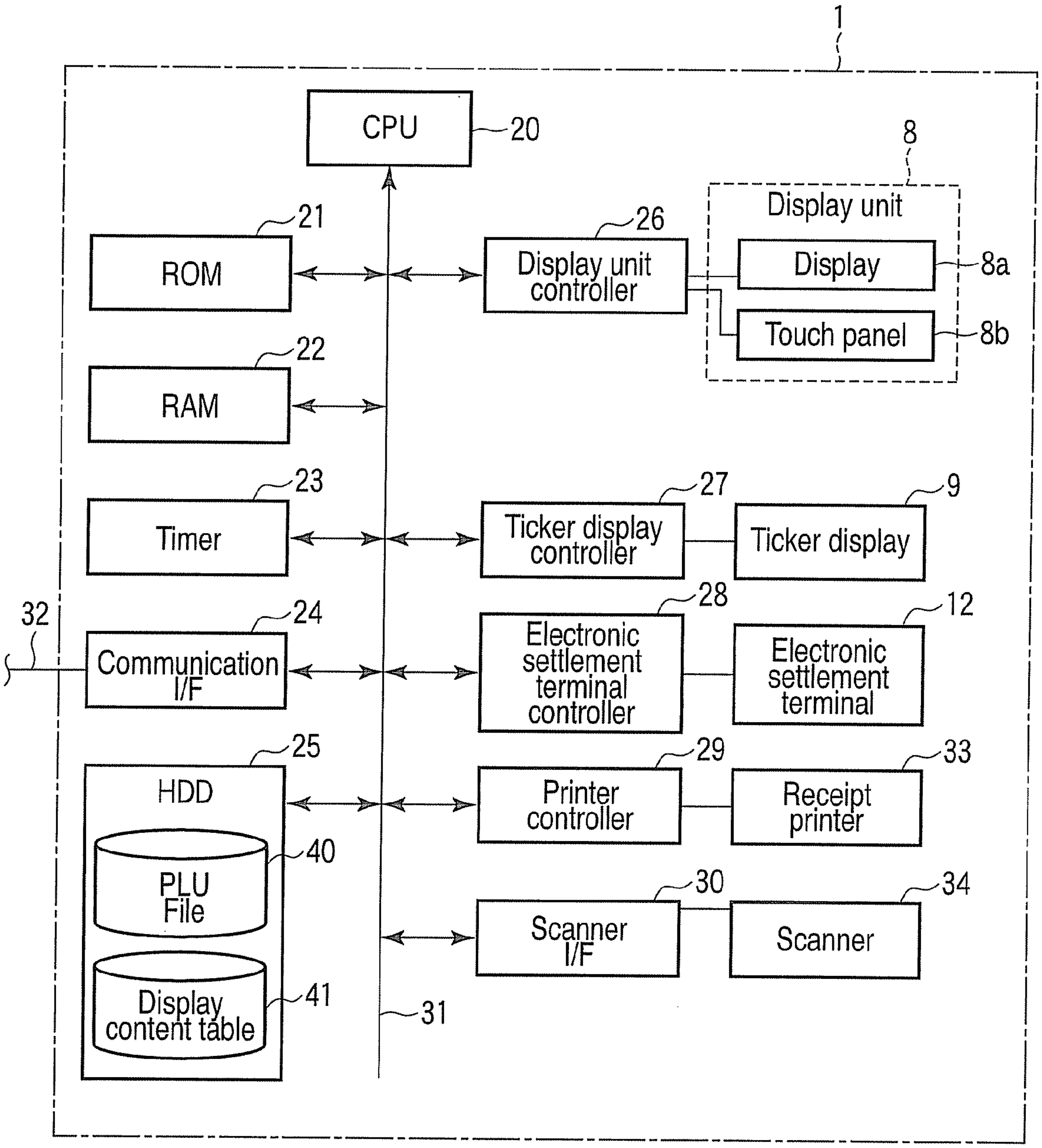
FIG. 2 is a block diagram of the self checkout terminal of the embodiment.

FIG. 2 is a block diagram showing a control circuit of the self checkout terminal 1. The control circuit of the self checkout terminal 1 is constructed such that a ROM (Read Only Memory) 21, a RAM (Random Access Memory) 22, a timer 23, a communication I/F (Interface) 24, a HDD (Hard Disk Drive) 25, a display controller 26, a ticker display controller 27, an electronic settlement terminal controller 28, a printer controller 29 and a scanner I/F 30 are connected through a bus line 31, such as an address bus and a data bus, to a CPU 20 (controller) to function as the center of control. A communication cable 32 communication connected to a LAN (Local Area Network) provided in a store is connected to the communication I/F 24. A display 8_a_ and a touch panel 8_b_ of the display unit 8 are connected to the display controller 26. The ticker display 9 is connected to the ticker display controller 27. The electronic settlement terminal 12 is connected to the electronic settlement terminal controller 28. A receipt printer 33 is connected to the printer controller 29, and a scanner 34 is connected to the scanner I/F 30.

The ROM 21 stores fixed data such as BIOS (Basic Input/Output System).

The RAM 22 forms various working storage areas according to processing scenes. Especially, during execution of an accounting process, the RAM forms a sales data storage area for storing sales data including commodity information and the number of sales attached thereto.

The timer 23 starts a clocking operation at timing instructed by the CPU 20, and outputs an interrupt signal to the CPU 20 when a specified time is clocked.

The display controller 26 converts display data outputted from the CPU 20 into a video signal and outputs it to the display 8_a_, and further, calculates a coordinate of a contact operation position based on an electric signal outputted from the touch panel 8_b_, and notifies it to the CPU 20. The display 8_a_ displays information based on the video signal outputted from the display controller 26 to the customer who operates the self checkout terminal 1. The touch panel 8_b_ is, for example, a resistive touch panel constructed so as to output a voltage drop amount corresponding to a contact position.

The ticker display controller 27 converts the display data outputted from the CPU 20 into a video signal and outputs it to the ticker display 9. The ticker display 9 displays information based on the video signal outputted from the ticker display controller 27 to the customer who settles the account by the self checkout terminal 1.

The electronic settlement terminal controller 28 controls communication timing between the electronic settlement terminal 12 and an electronic money storage medium such as an IC card or a portable communication terminal, and notifies the CPU 20 of the electronic money information detected by the electronic settlement terminal 12 from the electronic money storage medium.

The receipt printer 33 is a so-called thermal printer constructed such that for example, a receipt sheet of a thermal paper is nipped between a thermal head and a platen roller and is conveyed by a conveyance roller. A receipt printed by the receipt printer 33 is discharged from the receipt issue port 11. The printer controller 29 drives the receipt printer 33 and forms a pattern based on the print data received from the CPU 20 on the receipt sheet.

The scanner 34 optically reads the barcode held to the reading window 10, generates barcode data and outputs it to the scanner I/F 30. The scanner I/F 30 notifies the CPU 20 of the barcode data outputted from the scanner 34.

The HDD 25 stores an application file and an OS (Operating System) file and further stores a PLU file 40 to store commodity information, and a display content table 41 in which content to be displayed on the ticker display 9 is set according to the operation of the self checkout terminal 1. Incidentally, the HDD 25 functions as a storage section in this embodiment.

FIG. 3 is a schematic view showing an example of a data structure of the PLU file 40. The PLU file 40 stores commodity information including a name, unit price, producing district information, which corresponds to a PLU code uniquely assigned to each commodity sold in the store.

FIG. 4 is a schematic view showing an example of a data structure of the display content table 41. The display content table 41 stores information to be displayed on the ticker display 9, which corresponds to an operation in each process scene of the self checkout terminal 1. In the illustrated example, "standby" to indicate a standby state where an accounting process is not performed, "accounting start" to indicate the time of start of the accounting process, "barcode scan" to indicate the read time of a barcode by the scanner 34, and "settlement" to indicate the settlement time of a transaction are stored as the operation of the self checkout terminal 1. For the operation "standby", "CM information" indicating commercial information of the store and the like is correspondingly stored. For the operation "accounting start", "reading window guide" to indicate information for guiding the customer's eye to the position of the reading window 10 is correspondingly stored. For the operation "barcode scan", "commodity information" indicating commodity information of the commodity whose barcode is read is correspondingly stored. For the operation "settlement", "point information" indicating information relating to the point given to the customer of the transaction object is correspondingly stored.

Next, the operation of the self checkout terminal 1 will be described.

Accounting Process

First, an accounting process using the self checkout terminal 1 will be described.

When the customer places a shopping basket containing commodities before purchase on the receiving surface 7 of the commodity placement stand 3, the weight measuring unit incorporated in the commodity placement stand 3 reacts and measures the total weight of the commodities. This triggers the accounting process, and the scanner 34 shifts to the barcode read standby state.

At this time, when the customer takes out a commodity from the shopping basket put on the commodity placement stand 3 and holds the barcode attached to the commodity to the reading window 10, the scanner 34 detects the PLU code (identification information) represented by the barcode. At this time, the CPU 20 retrieves the commodity information corresponding to the detected PLU code from the PLU file 40, and stores sales data in which the found commodity information corresponds to the number of sales commodities into the storage area for sales data storage formed in the RAM 22.

While the input of the PLU code is received in this way, a close key to declare input completion of the PLU code is displayed on the display 8_a_ of the display unit 8. When the input of the commodity information of all commodities is completed, and when the customer contacts and operates the close key, the purchase price of the transaction is calculated based on the sales data stored in the storage area for storing the sales data, and is displayed on the display 8*a*. After the purchase price is displayed, the electronic settlement terminal 12 is controlled by the electronic settlement terminal controller 28 and shifts to the state where communication with an electronic money storage medium is on standby.

At this time, when the customer holds the electronic money storage medium to the electronic settlement terminal 12, electronic money information necessary for electronic settlement is read from the electronic money storage medium. When the electronic money information is notified from the electronic settlement terminal controller 28, the CPU 20 performs the electronic money settlement in a well-known procedure to complete the transaction, and ends the accounting process.

Ticker Display Process

Next, a ticker display process which is a characteristic process in this embodiment will be described. This process is continuously performed during activation of the system of the self checkout terminal 1 including execution of the accounting process.

Figure 5:
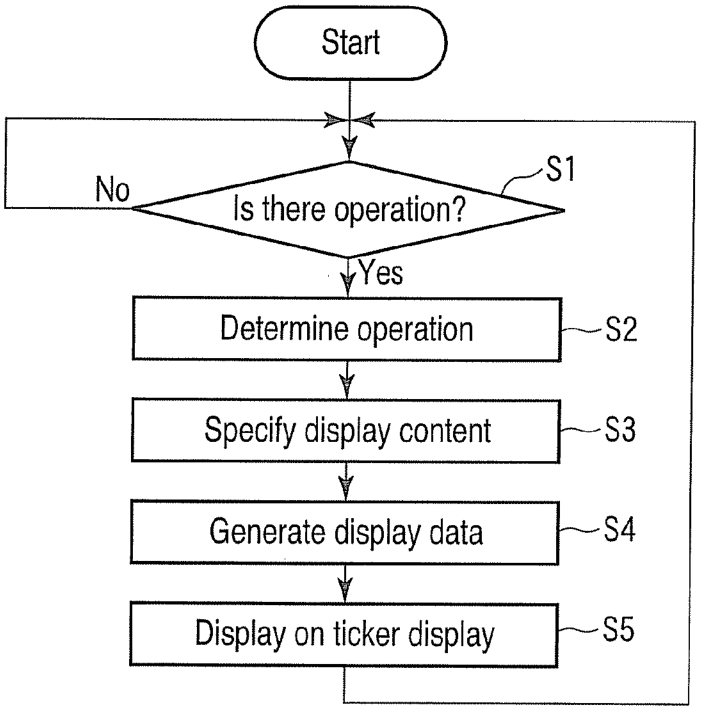
FIG. 5 is a flowchart of a ticker display process in the embodiment.

FIG. 5 is a flowchart of a process executed by the CPU 20 in the ticker display process. Incidentally, the ticker display process is realized by the control of software stored in the ROM 21 or the HDD 25.

The CPU 20 waits that the operation stored in the display content table 41 is performed by the respective devices constituting the self checkout terminal 1, such as the timer 23, the communication I/F 24, the display 8*a*, the touch panel 8*b*, the electronic settlement terminal 12, the receipt printer 33 and the scanner 34 (ACT 1). When one of the devices performs the operation stored in the display content table 41 (Yes at ACT 1), the type of the operation is determined (ACT 2).

In the process of ACT 1 and ACT 2, for example, a process to notify an execution program of a ticker display process that each operation is executed is incorporated in an execution program of each operation stored in the display content table 41, and when the notification is received, the execution program of the ticker display process detects each operation. The execution program of the ticker display process determines that the notification is received from which program, and the type of the operation is specified.

When the type of the operation is determined, the CPU 20 specifies the display content corresponding to the type of the operation from the display content table 41 (ACT 3). The display data to be displayed on the ticker display 9 is generated according to the specified display content (ACT 4), and the generated display data is outputted to the ticker display controller 27. At this time, the ticker display controller 27 generates a video signal based on the outputted display data and outputs it to the ticker display 9, and causes an image based on the display data to be displayed (ACT 5).

After the image is displayed on the ticker display 9, the CPU 20 again waits that an operation stored in the display content table 41 is performed (ACT 1), and when detecting the operation, the CPU executes the process of ACT 2 to ACT 5.

Figure 6:
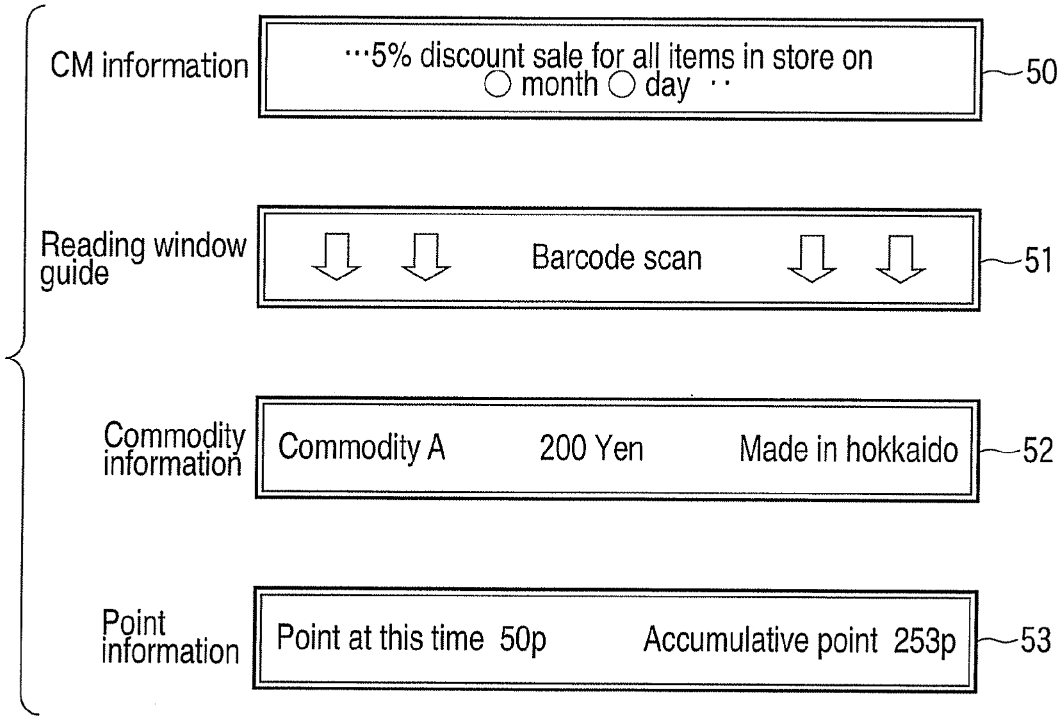
FIG. 6 is a schematic view showing a display information example of a ticker display in the embodiment.

When the data structure of the display content table 41 shown in FIG. 4 is used, the state of transition of the image displayed on the ticker display 9 in the ticker display process will be described with reference to FIG. 6.

When the accounting process relating to one transaction is completed, clocking by the timer 23 is started. When the timer 23 finishes clocking of the specified time, the CM information of the store and the operation guidance are displayed on the display 8*a* of the display unit 8, and the state shifts to the state of waiting for a next transaction. When this operation is detected (Yes at ACT 1), the CPU 20 determines that the type of the operation is "standby" (ACT 2). At this time, the CPU

20 specifies "CM information" corresponding to the operation "standby" as the display content from the display content table 41 (ACT 3). In this case, the CPU 20 detects the CM information for display to the ticker display 9 from the database stored in the HDD 25 or the store server connected through the communication cable 32, and generates the display data (ACT 4). The CPU 20 outputs the display data generated in this way to the ticker display controller 27, and causes the ticker display 9 to display an image such as, for example, a ticker display 50 shown in FIG. 6 (ACT 5). The ticker display 50 displays a message to notify the sale of the store as the CM information.

When the self checkout terminal 1 is in the standby state, and when the shopping basket is placed on the receiving surface 7 of the commodity placement stand 3, the accounting process is started as described before. When this operation is detected (Yes at ACT 1), the CPU 20 determines that the type of the operation is "accounting start" (ACT 2). At this time, the CPU 20 specifies "reading window guide" corresponding to the operation "accounting start" as the display content from the display content table 41 (ACT 3). In this case, the CPU 20 detects the image pattern to guide the position of the reading window from the database stored in the HDD 25 or the store server connected through the communication cable 32, and generates display data to represent the pattern (ACT 4). The CPU 20 outputs the display data generated in this way to the ticker display controller 27, and causes the ticker display 9 to display the image such as, for example, a ticker display 51 shown in FIG. 6 (ACT 5). The ticker display 51 displays downward arrows together with the word of "barcode scan", and guides the customer to the position of the reading window 10 provided below the ticker display 9.

When the self checkout terminal 1 waits for reading of a barcode, and when the barcode attached to the commodity is held to the reading window 10, the PLU code is read from the barcode. When this operation is detected (Yes at ACT 1), the CPU 20 determines that the type of the operation is "barcode scan" (ACT 2). At this time, the CPU 20 specifies "commodity information" corresponding to the operation "barcode scan" as the display content from the display content table 41 (ACT 3). In this case, the CPU 20 extracts the commodity information stored in the PLU file 40 correspondingly to the read PLU code, and generates display data including part of the extracted commodity information (ACT 4). The CPU 20 outputs the display data generated in this way to the ticker display controller 27, and causes the ticker display 9 to display the image such as, for example, a ticker display 52 as shown in FIG. 6 (ACT 5). The ticker display 51 is such that the commodity name, unit price, and producing district information, about which the customer appears to be particularly concerned in the commodity information, are displayed such as "commodity name A 200 Yen made in Hokkaido". Incidentally, the commodity information displayed on the display 8*a* of the display unit 8 includes a commodity image, a name of a category to which the commodity belongs, manufacturer information and the like in addition to the commodity name, the unit price and the producing district information. That is, the information amount of the commodity information displayed on the ticker display 9 is smaller than that of the commodity information displayed on the display 8*a*.

When the self checkout terminal 1 performs the accounting process, and when the close key displayed on the display 8*a* of the display unit 8 is touched and operated, and the electronic money storage medium is held to the electronic settlement terminal 12, the electronic money settlement is performed in the well-known procedure as described before. When this operation is detected (Yes at ACT 1), the CPU 20 determines that the type of the operation is "settlement" (ACT 2). At this time, the CPU 20 specifies "point information" corresponding to the operation "settlement" as the display content from the display content table 41 (ACT 3). In this case, the CPU 20 generates display data including a point newly given by the transaction and the accumulative point given to the electronic money storage medium (ACT 4). The CPU 20 outputs the display data generated in this way to the ticker display controller 27, and cause the ticker display 9 to display the image such as, for example, a ticker display 53 as shown in FIG. 6 (ACT 5). The ticker display 53 displays the point number such as "point at this time 50*p* accumulated point 253*p*", and notifies the customer of the newly given point and the accumulative point.

As described above, the self checkout terminal 1 of this embodiment includes the ticker display 9 in addition to the display unit 8 which is the main display unit. The ticker display 9 is provided at a position closer to the reading window 10 for scanner 34 than the display unit 8. When the ticker display 9 is provided at such a position, even when the customer performs the operation of holding the barcode attached to the purchased commodity to the reading window 10, the display content of the ticker display 9 is liable to be noticed by the customer, and information desired to be notified to the customer can be certainly transmitted.

Besides, the information displayed on the ticker display 9 is selectively switched by the operation of the self checkout terminal 1. Thus, the information optimum for the processing scene can be transmitted to the customer.

Specifically, when the accounting process is started, the information indicating the position of the reading window 10 is displayed on the ticker display 9. By this, even the customer unfamiliar to the operation can recognize at a glance that the barcode attached to the commodity has only to be held to the reading window 10. Besides, when the scanner 34 reads the barcode, the commodity information of the commodity is displayed. By this, the customer can confirm both the commodity information displayed on the ticker display 9 and the reading window 10 without moving the direction of eyes significantly. Thus, the operation efficiency of the commodity information input is remarkably improved and the accounting process is smoothed.

Modified Example

Incidentally, in this embodiment, the description is made on the case where the ticker display 9 is provided between the display unit 8 and the reading window 10. However, the installation position of the ticker display 9 may be modified within the range of not exceeding the distance between the display init 8 and the reading window 10. That is, the ticker display 9 can be installed below the reading window 10, or can be installed on the right or left side. However, according to the installation position of the ticker display 9, there is a fear that the ticker display 9 is shaded by the hand of the customer himself/herself who performs the scanning operation of the barcode or by the commodity. Accordingly, it is desirable that the ticker display 9 is provided at a position where the visibility can be sufficiently secured in view of the shape of the housing of the self checkout terminal.

Besides, in the embodiment, the scanner 34 reads the barcode held to the reading window 10 and inputs the FLU code of the purchased commodity. However, the scanner 34 may read information to specify the commodity by reading another kinds of symbol, such as a two-dimensional code, attached to the commodity. Besides, a camera is provided instead of the scanner 34, and the type of the commodity may be determined from the tint and shape of the commodity itself held to the reading window 10.

Besides, the ticker display 9 is not provided, but a ticker display area may be provided in the display surface of the display unit 8. In this case, the ticker display area is provided at a position closer to the reading window 10 side than the display position of information which appears to be most noticed by the customer, such as the commodity information and guidance displayed on the display 8*a* of the display unit 8. Even in this way, since the distance by which the customer moves the eye is shortened, and the effect of smoothing the accounting process is not lost.

Besides, as the combination of the operation of switching the display of the ticker display 9 and the display content, a combination other than those exemplified in the embodiment may be naturally adopted. For example, it is conceivable that weather prediction and news are displayed at the time of standby of the accounting process, the consumption period or expiration date of a commodity is displayed at the time of input of commodity information, or the guidance of a payment method using the electronic settlement terminal 12 is displayed at the time of input completion of the PLU code.

Further, the combination of the operation and the display content described in the embodiment may be modified. For example, in the embodiment, when the accounting process is on standby, the CM information is displayed, and when the accounting process is started, the information of guiding the position of the reading window 10 is displayed on the ticker display 9. However, even if the accounting process is not started, the information of guiding the position of the reading window 10 may be displayed before the commodity information is inputted. In this case, the accounting process is not triggered and started by the placement of the commodity on the commodity placement stand 3, but the accounting process may be started when the commodity is held to the reading window 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A self checkout terminal comprising:

a reading section configured to read identification information of a commodity from the commodity;

a main display configured to display information relating to the commodity whose identification information is read by the reading section;

a ticker display configured to display information and which is provided at a position closer to the reading section than the main display; and a controller configured to control the ticker display and to cause arbitrary information to be selectively displayed, wherein the controller is further configured to display information to guide a position of the reading section on the ticker display before the reading section reads the identification information from the commodity.

2. The self checkout terminal of claim 1, wherein the ticker display is provided between the reading section and the main display.

3. The self checkout terminal of claim 1, wherein the controller is further configured to selectively switch the information to be displayed on the ticker display according to an operation of the self checkout terminal.

4. The self checkout terminal of claim 1, wherein the controller is further configured to cause the ticker display to display the information to guide the position of the reading section in response to an accounting process being started.

5. A control method of a self checkout terminal, comprising:

reading, by a reading section, identification information of a commodity from the commodity;

displaying, by a main display, information relating to the commodity;

displaying information using a ticker display that is provided at a position closer to the reading section than the main display;

controlling, by a controller, the ticker display to cause arbitrary information to be selectively displayed; and displaying information to guide a position of the reading section on the ticker display before the reading section reads the identification information from the commodity.

6. A self checkout terminal comprising:

a reading section configured to read identification information of a commodity from the commodity;

a main display configured to display information relating to the commodity whose identification information is read by the reading section;

a ticker display configured to display information and which is provided at a position closer to the reading section than the main display; and a controller configured to control the ticker display and to cause arbitrary information to be selectively displayed, wherein the controller is further configured to cause the ticker display to display the information relating to the commodity in response to the reading section reading the identification information from the commodity.

7. The terminal of claim 6, wherein the ticker display is provided between the reading section and the main display.

8. The terminal of claim 6, wherein the controller is further configured to selectively switch the information to be displayed on the ticker display according to an operation of the self checkout terminal.

9. The terminal of claim 6, wherein an information amount of the information relating to the commodity displayed on the ticker display is smaller than an information amount of the information relating to the commodity displayed on the main display.

10. A self checkout terminal comprising:

a reading section configured to read identification information of a commodity from the commodity;

a main display configured to display information relating to the commodity whose identification information is read by the reading section;

a ticker display configured to display information and which is provided at a position closer to the reading section than the main display; and a controller configured to control the ticker display and to cause arbitrary information to be selectively displayed, wherein the controller is further configured to cause the ticker display to display specified commercial information until an accounting process is started.

11. The terminal of claim 10, wherein an information amount of the information relating to the commodity displayed on the ticker display is smaller than an information amount of the information relating to the commodity displayed on the main display.

12. The terminal of claim 10, wherein the controller is further configured to selectively switch the information to be displayed on the ticker display according to an operation of the self checkout terminal.

13. The terminal of claim 10, further comprising a timer configured to measure a specified time from completion of the accounting process, wherein the controller is further configured to cause the ticker display to display the commercial information in response to the timer completing measurement of the specified time.

14. A control method of a self checkout terminal, comprising:

reading, by a reading section, identification information of a commodity from the commodity;

displaying, by a main display, information relating to the commodity;

displaying information using a ticker display that is provided at a position closer to the reading section than the main display;

controlling, by a controller, the ticker display to cause arbitrary information to be selectively displayed; and causing the ticker display to display the information relating to the commodity in response to the reading section reading the identification information from the commodity.

15. A control method of a self checkout terminal, comprising:

reading, by a reading section, identification information of a commodity from the commodity;

displaying, by a main display, information relating to the commodity;

displaying information using a ticker display that is provided at a position closer to the reading section than the main display;

controlling, by a controller, the ticker display to cause arbitrary information to be selectively displayed; and causing the ticker display to display specified commercial information until an accounting process is started.

* * * * *